United States Patent
Corten

(10) Patent No.: US 8,182,231 B2
(45) Date of Patent: May 22, 2012

(54) WIND TURBINE WITH SLENDER BLADE

(75) Inventor: Gustave Paul Corten, Alkmaar (NL)

(73) Assignee: Cortenergy BV (NL)

( * ) Notice: Subject to any disclaimer, the term of this patent is extended or adjusted under 35 U.S.C. 154(b) by 858 days.

(21) Appl. No.: 12/244,186

(22) Filed: Oct. 2, 2008

(65) Prior Publication Data

US 2009/0068018 A1 Mar. 12, 2009

Related U.S. Application Data

(63) Continuation-in-part of application No. PCT/NL2007/050137, filed on Apr. 2, 2007.

(30) Foreign Application Priority Data

Apr. 2, 2006 (NL) .................. 1031492
Nov. 3, 2006 (NL) .................. 2000302

(51) Int. Cl.
*F04D 29/38* (2006.01)
(52) U.S. Cl. ...... 416/223 R; 416/23; 416/61; 416/241 R
(58) Field of Classification Search ............ 416/23, 416/61, 223 R, 241 R
See application file for complete search history.

(56) References Cited

U.S. PATENT DOCUMENTS

| 3,578,264 A | 5/1971 | Kuethe | |
|---|---|---|---|
| 2006/0280614 A1 | 12/2006 | Quell et al. | |
| 2008/0206055 A1* | 8/2008 | Godsk et al. | 416/147 |
| 2009/0074574 A1* | 3/2009 | Godsk et al. | 416/41 |

FOREIGN PATENT DOCUMENTS

| WO | 9011929 | 10/1990 |
|---|---|---|
| WO | 0015961 | 3/2000 |
| WO | 2005035978 | 4/2005 |

OTHER PUBLICATIONS

International search report in corresponding PCT/NL2007/050137.

* cited by examiner

*Primary Examiner* — Dung A. Le
(74) *Attorney, Agent, or Firm* — Brooks Kushman P.C.

(57) ABSTRACT

Wind turbine with a rotor blade relatively insensitive to turbulence because it is more slender than prior blades and is nevertheless able to generate sufficient lift by virtue of the fact that flow enhancing elements such as vortex generators combat flow separation. The slenderness is defined by the chord numbers C and D of which C is defined as $C = Nc_r c_l \lambda^2 / R^2$, in which N is the number of blades, $c_r$ is the local chord, $c_l$ the lift coefficient, r the radial position, $\lambda$ the tip speed ratio and R the rotor radius. Subsequently, the chord should be less than what follows from the equation C=M in which $M = -1.19 + 9.74 C_p - 21.01 C_p^2 + 17.50 C_p^3$ and $C_p$ is the power coefficient. This wind turbine is subject to about 2-12% less operational loads and to about 5-40% reduced survival wind speed loads compared to classical designs.

26 Claims, 7 Drawing Sheets

WIND TURBINE WITH SLENDER BLADE

FIELD OF THE INVENTION

Wind turbine comprising a rotor with airfoils with a reduced ratio between the variation of the lift force and the average lift force.

BACKGROUND OF THE INVENTION

The wind turbine can be a horizontal axis wind turbine or a vertical axis wind turbine comprising a rotor with rotor blades, with N the number of rotor blades and R the blade radius. Due to rotation, the blade tip at radius R obtains a tip speed $v_{tip}$ equal to the product of the rotor speed $\omega$ and the rotor radius R: $v_{tip}=\omega R$. The undisturbed wind speed V is the wind speed at the locus of the axis of the rotor when the wind turbine does not disturb the flow. The ratio between the $v_{tip}$ and V is the tip speed ratio $\lambda=\omega R/V$. An airfoil is a for the aerodynamics optimized profile which is round at the leading edge and sharp or cut off at the trailing edge. One side of the airfoil is the upper side or suction side, the other side is the lower side or the pressure side.

The curve through the centres of circles within the airfoil touching both the lower side and the upper side is called the camber line. At the leading edge this line continues to the airfoil contour. The line part which connects the most forward and the most backward part of the camber line is the chord c or the local chord $c_r$ at radial position r. A rotor blade may exist of several airfoils at the same radial position. In such a case the sum of the chords of the airfoils should be taken as the locale chord $c_r$.

The leading edge of the airfoil is located at 0% of the chord (0% c) and the trailing edge at 100% c. The largest distance between the camber line and the chord is the camber. The ratio between the diameter of the largest circle in the airfoil and the chord is the thickness t of the airfoil. Flexible or in position controllable parts of the aft part of the airfoil, which can move more than 2.5% c with respect to the leading edge are not part of the chord. The lift $L=\frac{1}{2}\rho U^2 c_l c$ and drag $D=\frac{1}{2}\rho U^2 c_d c$ of an airfoil are both proportional to the chord c and respectively to the lift coefficient $c_l$ and the drag coefficient $c_d$.

The chord follows from the equation C=M. Here in M is a dimensionless momentum loss. C is the chord number which is $Nrc_r c_l \lambda^2/(2\pi R^2)$ for a horizontal axis turbine and $Nrc_r c_l \lambda^2/R^2$ for a vertical axis turbine. This number prescribes how the parameters N, $c_r$, $c_l$, r, R and $\lambda$ should be chosen in order to realise a certain dimensionless momentum loss in the flow. Close to the axis of rotation, the chord number does not provide good values and therefore this number is primary useful in the range starting at 0.3R-0.6R and ending at 0.9R-1.0R. Example for a horizontal axis wind turbine with M=¾. When the designer chooses R=50 m, $\lambda=8$, N=3 and $c_l=0.9$ then it follows that $c_r r=68.2$ m$^2$, so at 25 m radial position the chord should be about 2.73 m. The average chord number in e.g. the range of 0.5R to 0.9R is:

$$\overline{C} = \frac{1}{0.4R}\int_{r=0.5R}^{r=0.9R} \frac{Nrc_r c_l \lambda^2}{2\pi R^2} dr.$$

The chord of a wind turbine blade can be calculated also with the equation $Nc_r r \lambda^2/R^2 = 8\pi\alpha(1-\alpha)/c_l$, in which $\alpha$ is the axial induction according to the Lanchester-Betz theory. The term on the left hand side of the equation is the chord number D, of which the average in e.g. the range of 0.4R to 0.95R is:

$$\overline{D} = \frac{1}{0.55R}\int_{r=0.4R}^{r=0.95R} \frac{Nrc_r \lambda^2}{R^2} dr.$$

The power coefficient $C_p=P/(\frac{1}{2}\rho AV^3)$, in which P is the power extracted from the flow according to the Lanchester-Betz theory, $\rho$ is the air density and A the swept area $\pi R^2$. The extracted power P will be higher than the electric power $P_e$ due to transfer losses. For values of $P_e$ between $0.5P_{nom}$ and $P_{nom}$, in which $P_{nom}$ is the nominal or rated power, it is assumed that $P=1.2P_e$. The pitch angle is 0° when the local chord at 0.99R is located in the plane in which the blade is rotating. The angle becomes more positive when the blade pitches towards vane position. The angle of attack is the angle between the chord and the undisturbed inflow in a 2D situation. The angle of attack at which the blade develops zero lift is the 0-lift angle. The lift (coefficient) increases approximately linear with the angle of attack for small angles of attack (e.g. between −8° and +8°). Most pitch regulated variable speed turbines operate essentially at or near constant tip speed ratio $\lambda$ below rated wind speed. The turbine may deviate from this constant $\lambda$ operation e.g. to avoid certain eigenfrequencies or to decrease sound emission. Still it is optimised for a certain $\lambda_{design}$ and the airfoils operate on average at the angle of attack $\alpha_{design}$ which gives optimum performance. At $\alpha_{design}$ the airfoil develops a lift coefficient $c_{l,design}$ design and has a lift over drag ratio $L/D_{design}$. When actual turbines produce power under non-extreme conditions and below rated wind speed, the mean value of the angle of attack and also of the lift coefficient approach the design value. The momentary realisations of those parameters behave stochastic due to turbulence, yaw, shear etc. A common method to characterise a wind turbine is to bin parameters like the 10-minute averaged power or angle of attack or lift coefficient as a function of the 10 minute averaged wind speed. When many data points are collected in each bin and averaged a more or less accurate estimate of the averages of those parameters is obtained. The so obtained value of for example a lift coefficient at a certain wind speed is the mean lift coefficient or the 10 minute averaged lift coefficient. If the turbine is produced conform the design, those mean or 10 minute averaged values correspond to the design values. So essentially the design value, the 10 minute averaged value and the mean value of a parameter such as the lift coefficient or angle of attack are equivalent. The angle at which the airfoil stalls or the flow separates from the surface is airfoil dependent. A typical stall angle is +10°, at which the lift coefficient is about 1.0 to 1.6. At larger angles $c_l$ increases slightly or even decreases and simultaneously $c_d$ increases, so that the efficiency of the rotor blades drops.

Flow separation can be avoided with lift enhancing means, such as known in literature. Examples of such lift enhancing means are vortex generators (VGs), gurney flaps, lengthening of the chord, increase of camber, suction of the boundary layer, flaps near the leading edge or near the trailing edge, deformation of a flexible part at the trailing edge of the airfoil, application of the Magnus effect, FCS such as described in Sinha, S. K., WO03067169, synthetic jets which feed energy into the boundary layer such as is known by e.g. Gerhard, L., U.S. Pat. No. 4,674,717 and MEM translational tabs. Most of those options can be applied in a passive and an active sense, in said active case the control can be by pneumatics, hydraulics, electromagnetics, piezo electrics, by MEM translational tabs or any other control method known from literature. All those lift enhancing means can principally be attached as separate elements to the blade or can be integrated with the blade.

VGs are elements which generate vortices which feed energy into the boundary layer. VGs can be elements which are more or less submerged in the surface and are known in many different shapes. Examples are a special curvature of the airfoil surface itself (e.g. cavities) or surfaces which extend from the airfoil surface into the flow. Possible connection parts such as a base which is connected to the VG, is not counted as part as the VG. The chord position of the VG is related to the part of the VG at the smallest chord position. The base can be essentially flat or following the local airfoil shape. Known shapes of VGs can be found in Waring, J., U.S. Pat. No. 5,734,990; Kuethe, A. M., U.S. Pat. No. 3,578,264; Kabushiki, K. T., EP0845580; Grabau, P., WO00/15961; Corten, G. P., NL1012949, Gyatt, G. W., DOE/NASA/0367-1 etc. VGs may have a length of about 3% of the chord, a height of about 1% of the chord and a mutual distance of about 5% of the chord. VGs postpone stall to larger angles of attack. Airfoils with VGs reach typical lift coefficients of 1.5-2.5 at angles of attack of e.g. +12° tot +25°. Three or more VGs at regular spacing attached essentially in a line biased less than 30° from the line perpendicular to the flow direction is defined as a basis line of VGs. Tangentials are circles around the centre of rotation in the plane of rotation of the applicable airfoils.

SUMMARY OF THE INVENTION

Wind turbine costs are high because of the loads which require much material. Therefore turbine designers aim at high electricity production at low loads. A disadvantage of the present wind turbines is that the loads by the wind vary and that this variation leads to additional costs. An extreme case of a disadvantageous load variation is that wherein a blade bends so much that it hits the tower. At wind speeds above $V_{cut-out}$ the turbine has to be stopped to avoid overloading, which reduces production and adds uncertainty to the predicted production. Another disadvantage is relevant at high wind speeds when turbines are usually halted. The wind pressure on the blades causes high loads because the required chord of the turbine blades is large. A further disadvantage is that the loads increase when turbines are operated in the wake of other turbines and need to be placed far apart which costs space and additional cable length.

Another disadvantage of the present turbines is that the aerodynamic characteristics of the rotor blades are hard to predict and therefore new prototypes often undergo a long and costly phase of testing and adaptation before they fulfil.

Furthermore when a turbine is operated at a reduced tip speed ratio to meet a certain sound emission level, the efficiency drops rather much, since in fact the blades need adaptation for such situations.

A further disadvantage is that the high moments require much and strong material in the case of slender blades. Overcoming this disadvantage by the application of thick airfoils may lead to flow separation thus more drag and less lift. Another disadvantage of actual wind turbines is that the induction near the centre of a wind turbine rotor is less than further outside. This 'leak' in the rotor centre reduces the pressure difference over the rotor and therefore reduces the power.

A further disadvantage of present rotors is that the blade performance degrades substantially by contamination.

The aim of the invention is to reduce the ratio between the variation of the lift force and the average lift force of wind turbine blades and more in general to overcome the mentioned disadvantages. According to a first aspect of the invention the state of the art airfoils are replaced by airfoils with a 10 minute averaged lift coefficient of more than 1.1, particularly more than 1.2 and more particularly more than 1.4 and preferably about 1.6 in the range between 0.5R and 0.95R. Special benefit is obtained by using airfoils between 0.4R and 0.95R with a mean lift coefficient which is higher than 1.5 and in particular higher than 1.75 and more particularly higher than 2.0 in a part of the operating range excluding extreme conditions.

Since the lift of an airfoil is essentially proportional to both $c_l$ and c, the product $cc_l$ should have a minimum value to reach the required lift. The designer can freely choose c and $c_l$ as long as the product $cc_l$ is larger that this minimum. Without notice the designer applies the same argument to lift variations, which is not correct. Surprisingly the lift variations are unlike the lift essentially independent of the lift coefficient $c_l$. When the designer uses this new insight, he would reduce c and increase $c_l$, so that the lift variations become less. This is especially relevant in the outer part (r>0.5R) of the rotor.

This way the variation of the lift force due to turbulence, wind shear, turbine misalignment, blade motions, control errors etc. may reduce by more than 30%. This mitigates both the fatigue and extreme loads, which is beneficial for the entire wind turbine structure including the foundation. It enables commissioning of turbines on high turbulence sites. In wind farms one can choose a smaller spacing between the turbines.

The text below describes the background of a number of preferred embodiments of the invention for which also reference is made to the sub claims.

Further benefit is obtained when airfoils are applied which operate on 10 minute averaged angles of attack which deviate from the 0-lift angle by more than 10°, and particularly more than 12° and more particularly more than 14° and preferably about 16°.

For wind turbines with a power coefficient $C_p$ between ⅓ and 16/27, the dimensionless momentum loss M can be determined in many ways. One method of special benefit is $M=-1.19+9.74C_p-21.01C_p^2+17.50C_p^3$. By setting the so obtained M equal to the chord number C and by substitution of N, r, $c_l$, λ, R, the local chord $c_r$ can be determined. Further advantage is obtained when $c_r$ is chosen smaller than the value which follows assuming $c_l=1.1$ and particularly 1.3 and more particularly 1.5 and even more particularly preferably 1.7.

Example: A classic horizontal axis turbine has an airfoil near the tip with a 0-lift angle of −3°, a maximum lift coefficient of 1.3 at 10° angle of attack and a lift coefficient which is linear by 0.1 per degree between those angles. Above 10° angle of attack the airfoil stalls and the efficiency drops much. Assume the average angle of attack is 7° and due to turbulence it varies by ±3°, then the lift coefficient varies from 0.7 to 1.3 and its average is 1.0. The lift variation is 0.6/1.0=60% of the average. This is a measure for the load variation on in the blades, the transmission, the bearings, the tower, the foundation etc, and everywhere increases costs. According to an example of the invention we choose airfoils with VGs so that stalling is postponed to a larger angle of attack. The maximum lift coefficient is now e.g. 1.8 at an angle of attack of 15°. The rotor is designed so that the average angle of attack is 12° and the average lift coefficient is 1.5. Since the lift is proportional to the product of chord and lift coefficient for small α, we choose the chord smaller by a factor of 1.5, so that the lift and thus the yield are equal. Due to turbulence the angle of attack varies in this case between 9° and 15° without stalling. With furthermore the same assumptions it follows that the lift coefficient varies between 1.2 and 1.8. Surprisingly the variation is only 0.6/1.5=40% of the average, or ⅔ of the load variation without the invention. Also load variations due to yawed inflow or wind shear are less. By parking the blades above $V_{cut-out}$ so that the maximum positive lift is not reached and the lift preferably is negative, the loads on the blades will be less by about the same factor as the chord reduction. A parking position of particular benefit is when the pitch angle is set outside the range of 30°-100°.

Further advantage of the load mitigation according to the invention is that less (expensive) turbine control options are required. The common active controlled options are pitch control (to vane or to stall) and variable rotation speed. A preferred embodiment of the invention considers a wind turbine with 2 and particularly 1 or more particularly 0 active control options selected from the said active control options.

Further advantage is obtained when lift enhancing means such as VGs are applied on a rotor blade on which those means are attached as separate members or when those means are integrated with the rotor blade. It is state of the art to correct rotors with bad performance by the application of VGs. Such a case is described in Corten, G. P., "Flow Separation on Wind Turbine Blades", ISBN 90-393-2582-0. In the case of newly designed rotors the expert advises against the application of VGs, since the prejudice is that they will add noise and drag, without further advantage. It is commonly known from wind tunnel experiments that, for small angles of attack, the drag of an airfoil without VGs is less than the drag of the same airfoil with VGs. Surprisingly this advice is not correct and is based on an incorrect experiment. An airfoil without VGs should be compared to an airfoil with VGs with a reduced chord which reaches the same lift.

Example: Assume the airfoil without VGs has $c_l$=1.0, $c_d$=0.01 and c=1 m and the airfoil with VGs has $c_l$=1.5, $c_d$=0.012 en c=⅔ m. Both airfoils develop the same lift since the product $cc_l$ is constant. The drag of the airfoil without VGs is proportional to $cc_d$=0.01×1=0.01 and that of the airfoil with VGs is $cc_d$=0.012×⅔=0.008. So with VGs the drag is less, even while the drag coefficient is higher. Apart from that the drag coefficient can also decrease by attaching VGs. Further advantage is obtained because the VGs condition the boundary layer much and therefore the effects of contamination are relatively less important. This leads to less production losses in case of contamination.

Further advantage is obtained because the application of lift enhancing means essentially at the suction side increases the maximum lift for the positive angles while the maximum lift for negative angles of attack essentially is unchanged. Preferred embodiments of the invention have a ratio $c_{l,max}/c_{l,min}$ less than −1.2−0.2·% cam and in particular less than −1.4−0.2·% cam, wherein $c_{l,max}$ is the maximum lift at positive angle of attack, $c_{l,min}$ is the maximum lift at negative angles of attack and % cam is the camber in percent of the chord, so when the camber is 6% said ratio is preferably larger than 2.2 and in particular 2.4. Therefore less measures (addition of foam or application of a higher percentage second type fibres) are required at the aerodynamic suction side to avoid buckling.

Further advantage is obtained by the application of carbon fibres, which are suitable to add stiffness and to take up tensile loads, at the aerodynamic suction side. This leads to a mass reduction and less tip deflection, which will reduce costs in the entire turbine. For the definition of first type and second type fibres reference is made to Bech, A. e.a., WO 2004/078465. In this patent an asymmetric laminated part is already noted. However is was not clarified what specifically is asymmetric and also not what the arguments are for an asymmetric structure while those arguments (asymmetric aerodynamic behaviour) does not turn up until blades according to the present invention are used.

Further advantage is obtained by the application of air inlets such as slits in the airfoil at the suction side between 5% c and 60% c. Those inlets are preferably located in the radial range of 0.05R to 0.5R. These inlets are connected to channels in the blade which run to larger radial positions and which have an opening at the trailing edge of the blade. The centrifugal force on the air in the channel provides a natural suction. Further advantage is obtained by connecting inlets of more than 10% difference in radial position to different channels. Further advantage is obtained when the inlets can be opened or closed actively by using MEM tabs or piezoelectrics.

Further advantage is obtained by application of the blades up side down: the suction side as pressure side and the pressure side as suction side, in particular at wind speeds above 12 m/s and more particularly above 14 m/s. In operational terms this means that the turbine pitches the blades by about 150° and that the turbine stops and starts up again in the other rotational direction. Alternatively the nacelle is yawed over 180° so that the rotor changes from upwind to downwind operation. In this case the direction of rotation of the rotor remains the same. With the blades up side down, the variation of the lift force developed by the entire blade is less, the extreme lift force is less and the lift force acts on a smaller radial position, so that yaw and blade root moments are less. Those are reasons to increase the $V_{cut-out}$ from the classical value of 25 m/s to 30 m/s or to 35 m/s or to higher values.

With increasing turbine size the material usage increases faster than the yield, therefore saving material is of more importance for larger turbines. Therefore the invention is particularly relevant for turbines with a rotor diameter larger than 60 m, particularly larger than 80 m and more particular larger than 100 m.

At constant relative thickness, the reduced chord according to the invention may require more material to carry the loads. To carry the loads with little material and to add stiffness the blades can be split in an upper blade and a lower blade at e.g. 0.2R-0.7R. Further advantage is obtained when the first type fibres at the pressure side continue from the non-divided outer part of the blade in the upper blade. Optionally the first type fibres at the suction side of the non-divided outer part of the blade continue in the lower blade. Further advantage is obtained when the upper and the lower blade reach a mutual distance of at least 5% R and particularly at least 10% R. The asymmetric aerodynamic behaviour of the blades leads to the situation that the upper blades takes mainly pressure loads and the lower blades take mainly tensile loads. According to an example of the invention the lower blade preferably has a 20% and particularly 40% and more particularly a 60% shorter chord than the upper blade at equal radial positions. A further advantage is that the addition of the chords of the lower and the upper blades increases the yield because 'leakage' from pressure side to the suction side is avoided.

Further advantage is obtained by the application of relatively thick airfoils to carry the loads with little material and to add stiffness. The reason is that with VGs, possibly attached on both sides, flow separation can be avoided, so that thick airfoil can have high efficiency in a large angle of attack range. Airfoils of at least t=25% c are applicable at radial positions >0.55R and particularly at radial positions >0.65R and more particularly at radial position >0.75R.

Further advantage is obtained by application of VGs at the pressure side to avoid flow separation. Doing this the maximum negative lift does not or slightly increase because the VGs are preferably placed close to the trailing edge at chord positions larger than 30% c, particularly larger than 50% c and more particularly larger than 70% c.

Further advantage can be obtained by using airfoil with a camber of more than 6% c and particularly of more than 8% c and more particularly of more than 10% c. The additional camber avoids a deep suction peak at large angles of attack, which reduces sensitivity to contamination. Furthermore airfoils with high camber often have a high L/D ratio at large angles of attack.

When multiple VGs or basis line of VGs are located behind each other in flow direction, one can speak about front, middle and rear VGs. The front VGs correspond to the VGs at the smallest chord position, the rear VGs to those at the largest chord position and those in between are the middle VGs. Further advantage is obtained when the VGs in the middle are larger than the front ones and particularly when they are also larger than the rear ones.

Further advantage is obtained by placement of some additional VGs upstream with respect to the basis line of VGs. The additional VGs keep the flow longer attached up to the basis line downstream. Those additional VGs reduce hysteresis of the $c_l$–$\alpha$ relation when $\alpha$ passes the stall angle. Those VGs can be located between 3% c at the pressure side and 10% c at the suction side and more particularly between 0% c and 5% c at the suction side. It is beneficial when VGs which are located behind each other in flow direction generate vortices of the same rotational direction.

Further advantage is obtained by attachment of VGs on the airfoil between the position of the stagnation point and that of the suction peak at an angle of attack of 5°. In this range the advantage is that the VGs are located in a low speed area at small angles of attack. When the angle of attack increases then the suction peak (the locus of maximum flow speed) shifts towards the VGs which therefore become more effective. So the VGs have low activity at small angles (thus little drag increase) and high activity when it is necessary at large angles.

To reduce said $c_l$–$\alpha$ hysteresis, one can also apply long VGs which extend e.g. more than 10% c or even more than 30% c in chord direction. In this design the blade surface is provided with ribs under an angle with the flow, of which the upflow part preferably is located at a smaller radial position than the downflow part.

In the case of a vertical axis turbine the angles of attack also vary without turbulence. The angle of attack variation is inversely proportional to the tip speed ratio $\lambda$. To keep the angle of attack variation in the range of −10° to +10°, $\lambda$ should not become less than about 4½. For lower $\lambda$ values the airfoils stall. Application of airfoils with VGs on both sides delays stall to larger angles of attack so that a $\lambda$ of 4, 3½, 3 or even 2½ can be used without stalling. A further advantage for the VAT turbine (when used in air or in water) is that it becomes self starting by attachment of VGs at less than 20% c, particularly less than 15% c and more in particular at less than 10% c on both the suction and pressure side of an airfoil or hydrofoil.

Further advantage is obtained by using the high lift coefficients since it enables operations at lower tip speed ratios which reduces noise.

Preferably several VGs (1, 2, 4 or another number) and the ground plate are manufactured as one piece or even as a tape of a flexible material such as rubber, polyurethane or an elastomer possibly with additives to block UV-radiation. This is called a VG-element and is favourably manufactured of plastics of the families PVDF, FEP, PEEK, PI, PEI, PES and PFTE.

The VG-element can be attached to the rotor blade with any known technique. It is of particular advantage to provide the ground plate partly of double sided adhesive and partly with fluid adhesive such as a cyanoacrylate. The double sided adhesive provides direct fixation after which the fluid glue has time to harden. The VGs can be attached with a hinge and only fold out after the blades are installed to the turbine. The side of the ground plate which will be attached to the blade can be slightly concave with a radius of curvature which is smaller than the radius of curvature of the blade at the position of attachment.

Further advantage is realised when the VGs have curvature in flow direction so that the angle between the flow without VG disturbance and the VG increases by preferably 5° to 15° in flow direction and particularly increases in the range of 2° to 30° are effective. This curvature avoids Kelvin-Helmholtz instability of the VGs and so increases durability.

Further advantage is obtained by the application of airfoils of which the lift is less dependent on the angle of attack in other words which have a $dc_l/d\alpha$ smaller than 1.1, and particularly smaller than 1.05 and more particularly smaller than 1.0 in the angle of attack range of 4° to 7°.

Further advantage is obtained by replacing the old rotor of an existing wind turbine by a new rotor according to the invention. This new rotor can be larger at the same load level and therefore can increase production. The old rotor is preferably replaced by a new rotor which has in the range of 0.6R to 0.95R a chord which is at least 10% less and preferably at least 20% at equal radial positions and more particularly is provided with VGs in that range.

Further advantage of the invention is that the properties of the produced blades according to the invention can be changed by adaptation of the lift enhancing means and in particular the VG-pattern regarding position, type, mutual spacing, size etc. When a further delay of stall is preferred possible VG-pattern adaptations are: Increasing the size of VGs (e.g. 25%), reducing the spacing in between VGs (e.g. 25%), placing more VGs (e.g. an additional basis line), increasing the angle between the flow and VGs (e.g. by 5°), changing the position of the VGs (e.g. 5% c), etc. In particular when the sound emission of a turbine is too high, the tip speed ratio may be reduced. Then adaptation of the blades to more optimal operation at higher angles of attack is preferred. Other cases wherein adaptability is also relevant are when blades of about the same design are used for different wind climates or on different turbines.

Further advantage is obtained by the application of controllable VGs. This can be used to decrease the maximum lift above rated wind speed, which may be reason to increase the cut out wind speed. It also can be used as a method to decrease the torque of the rotor in case of a failure, emergency stop or manual stop, which lowers the cost of other brake systems. The VGs can be switched to an effective state when a delay of low separation is preferred and to ineffective states when not. According to a preferred embodiment of the invention the VGs are be controlled by piezoelectrics or by MEM tabs and in particular by cylindrical MEM devices or piezoelectrics which enable a direct rotation of the vortex generator over e.g. 15°. The VG can be attached to this piezoelectric or MEM device so that its orientation to the flow can change from non-effective to effective. The effectiveness may be controlled by changing the angle between the VG and the flow, by folding it in or by retracting it more or less in the airfoil surface. Controllable VGs have the advantage of a faster response compared to pitching a blade. A preferred embodiment of the invention concerns a wind turbine with fixed rotor blades and controllable vortex generators.

Further advantage is obtained by providing a rotor blade according to the invention of at least one strengthened point such as a hoisting point which is suitable for lifting the blade where by this point preferably is located at less than 1 chord length of the centre of mass of the blade. This avoids damage to the VGs since a hoisting band around the blade is not needed during the installation of the blade.

Further advantage is obtained by alignment of the VGs parallel to the local undisturbed (by the VGs) flow at about the 0-lift angle ±3° or parallel to the tangentials. With increasing angle of attack the flow on the suction side will bend radially outward, so that the angle between the VG and the flow increases and a stronger vortex is generated. This way the VGs become active at high angles of attack when they are needed and hardly add drag at small angles of attack when they are not needed.

Further advantage is obtained when the upstream side of the VGs is located at a smaller radial position than the downstream side so that the VGs force the flow towards larger radial position so that the natural radial flow component in the boundary layer is increased.

DETAILED DESCRIPTION OF PREFERRED EMBODIMENTS OF THE INVENTION

Figure 1:
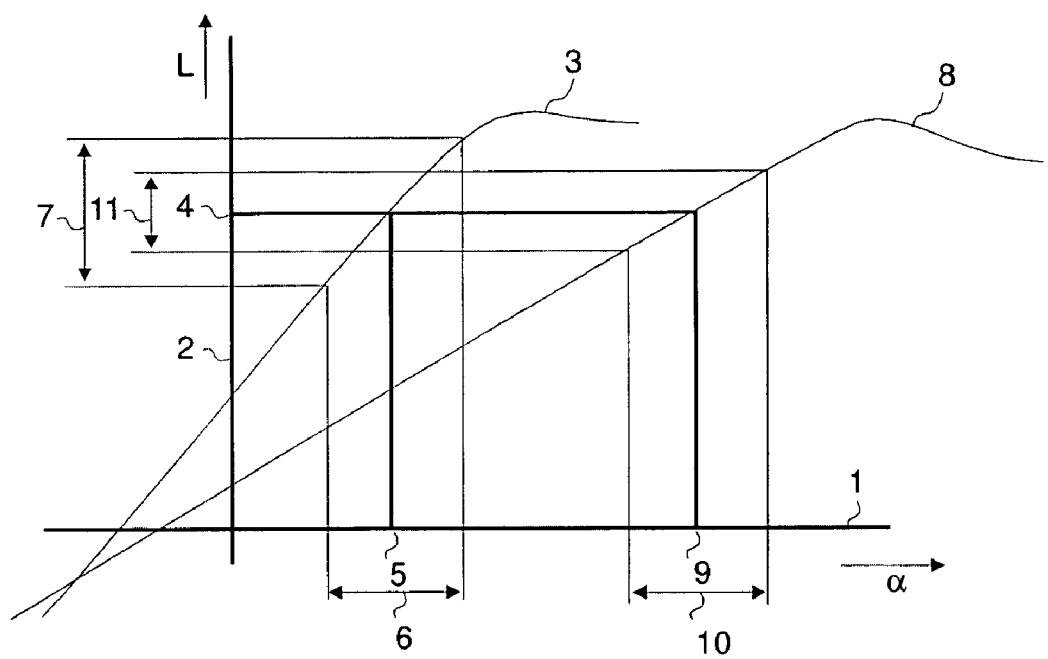
FIG. 1 shows a plot of lift versus angle of attack.

FIG. 1 shows a plot of the lift L versus the angle of attack α. Curve 3 shows the relation for a classical airfoil without lift enhancing means. To reach a given lift 4 the flow should enter the airfoil under an angle of attack 5. Due to e.g. turbulence in the wind the angle of attack varies in range 6 and therefore the lift will vary in range 7. An airfoil according to the invention with a higher lift coefficient and a shorter chord behaving like curve 8 should reach the same lift 4. This is realised at a larger angle of attack 9. Assuming the same turbulence in the wind, the angle of attack varies in range 10 which is as wide as range 6. Now the surprising element: The lift variation 11 of the airfoil with the higher lift coefficient is less than the lift variation 7 of the classical airfoil.

Figure 2:
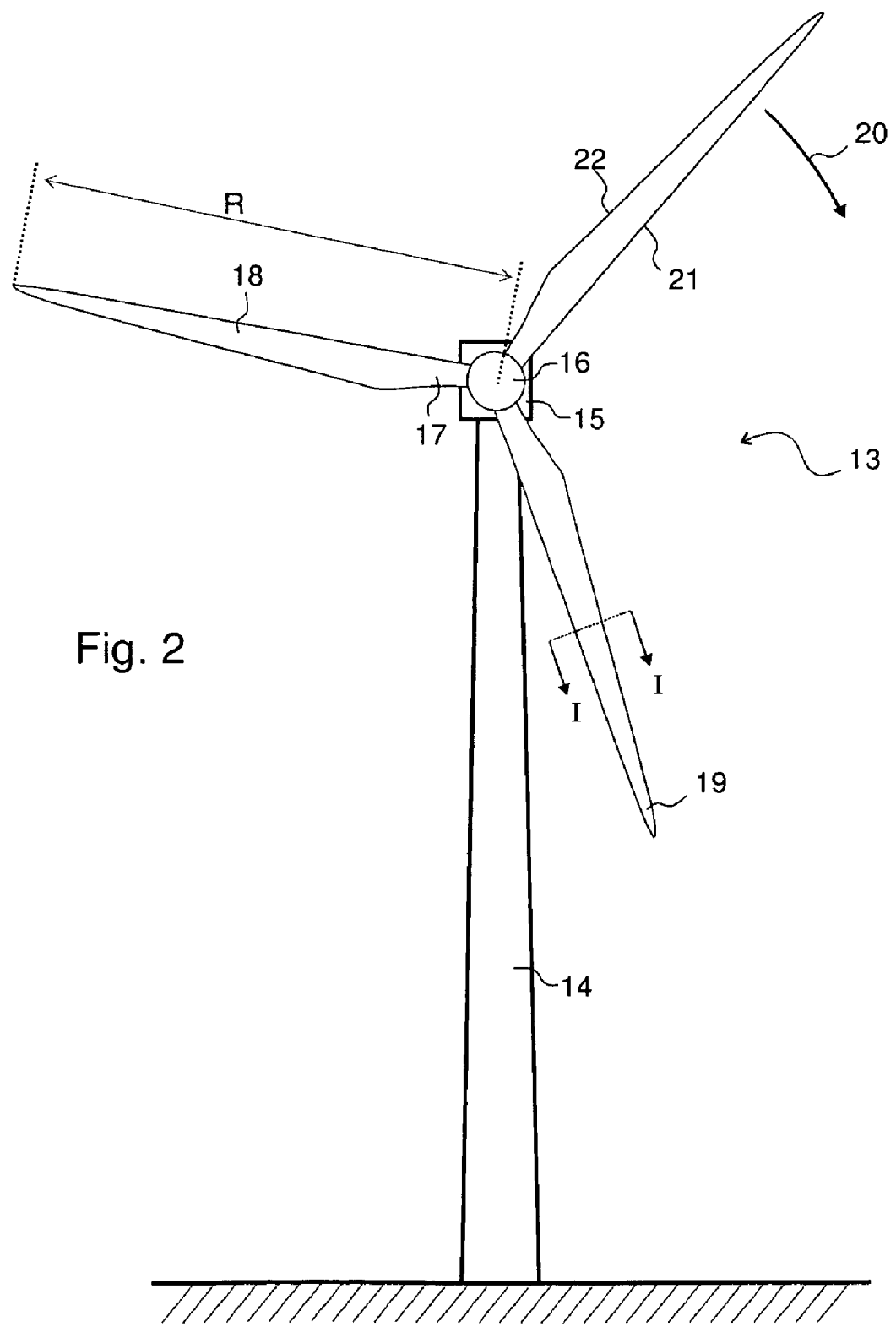
FIG. 2 shows an upwind turbine with tower and nacelle.
Figure 3:
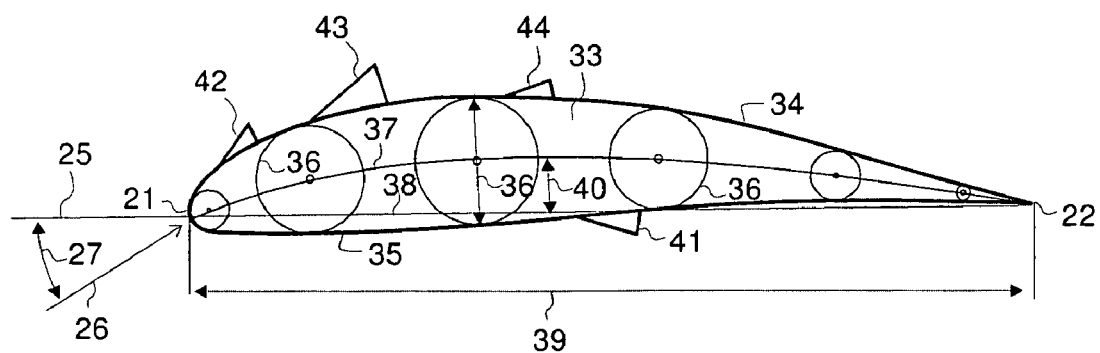
FIG. 3-7 show airfoil cross section I-I indicated in FIG. 2.
Figure 4:
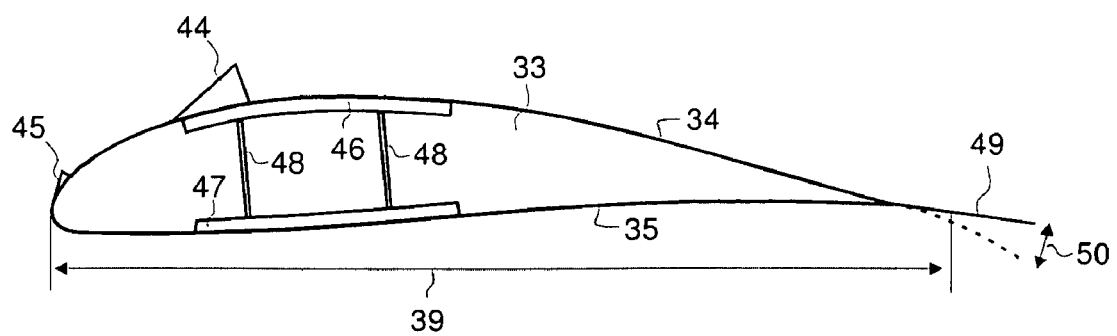

FIG. 2 shows as example of the invention an upwind turbine 13 with tower 14 and nacelle 15. The turbine rotor of radius R comprises a hub 16 and blades 18 with tip 19 and root 17. On the rear side of the blade VGs are installed which are not visible in the figure. The blades are rotating in the direction of tangential 20 and comprise a leading edge 21 and a trailing edge 22. FIGS. 3 to 7 show airfoil cross sections I-I indicated in FIG. 2. The cross sections show the suction sides 34 and the pressure sides 35. FIG. 3 shows the angle of attack α 27 the extended chord 25 and the undisturbed flow 26. The line through the centres of the circles 36 is the camber line 37. This line intersects with the chord 38 of length 39. The leading edge of the airfoil is shown by 21 and the trailing edge by 22. On the suction side, front 42, middle 43 and rear 44 VGs are applied and on the pressure side also VGs 41 are applied. FIG. 4 shows another realisation of VGs 45 on small chord position and VGs 44 on a larger chord position. The flexible trailing edge 49 shown in two positions in range 50 is not counted as part of the chord 29 if range 50 is more than 2.5% c with respect to the leading edge. The blade comprises first type fibres at the suction side 46 and at the pressure side 47 which extend perpendicular to the cross sections. The shear web 48 is located in between the suction side and pressure side.

Figure 5:
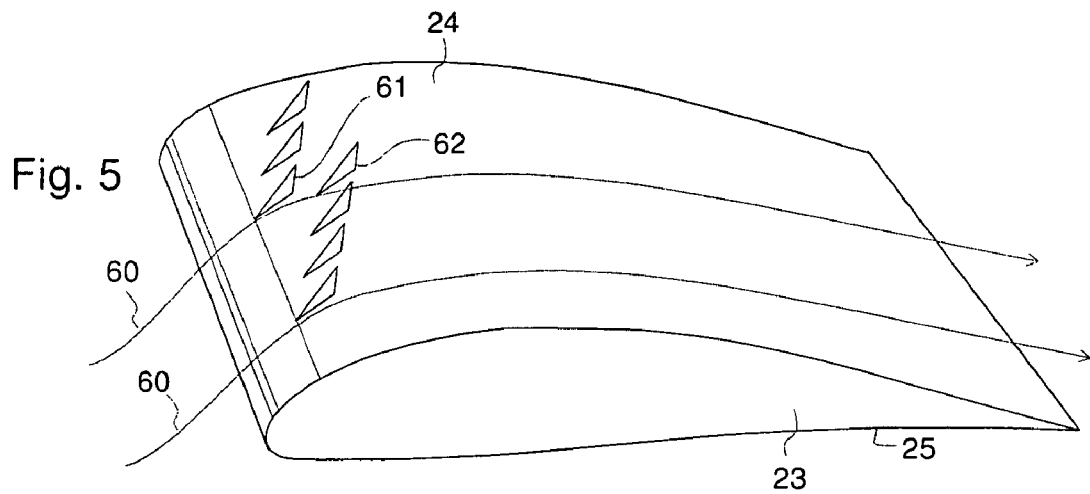
Figure 6:
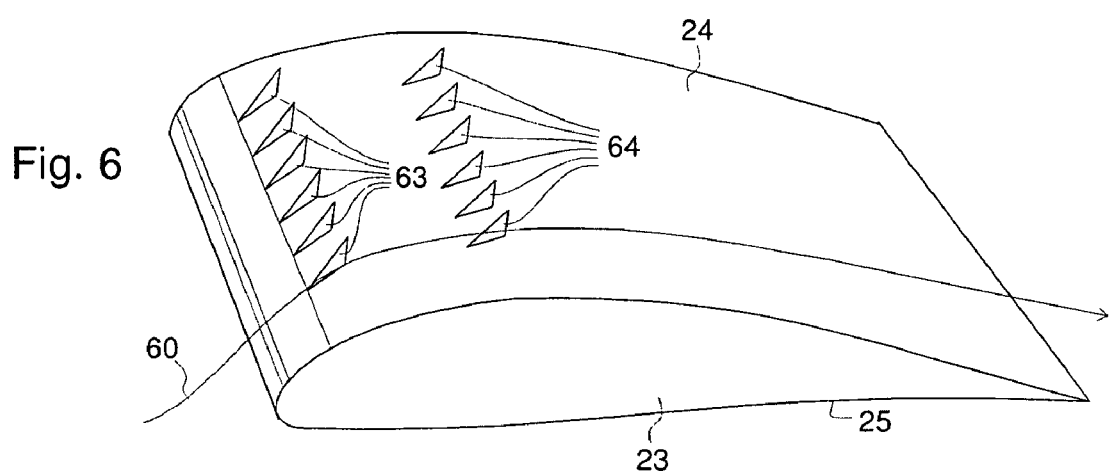
Figure 7:
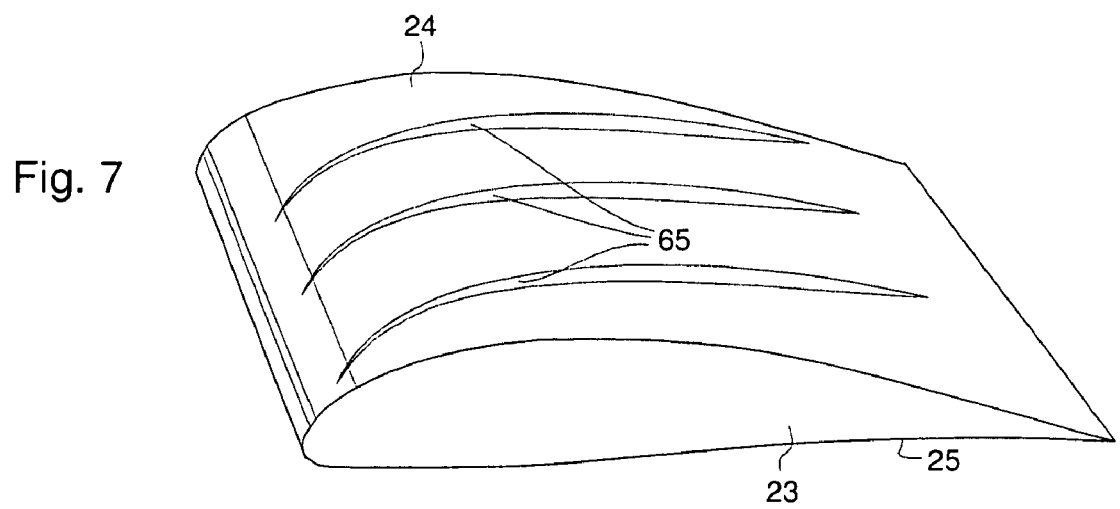
Figure 8:
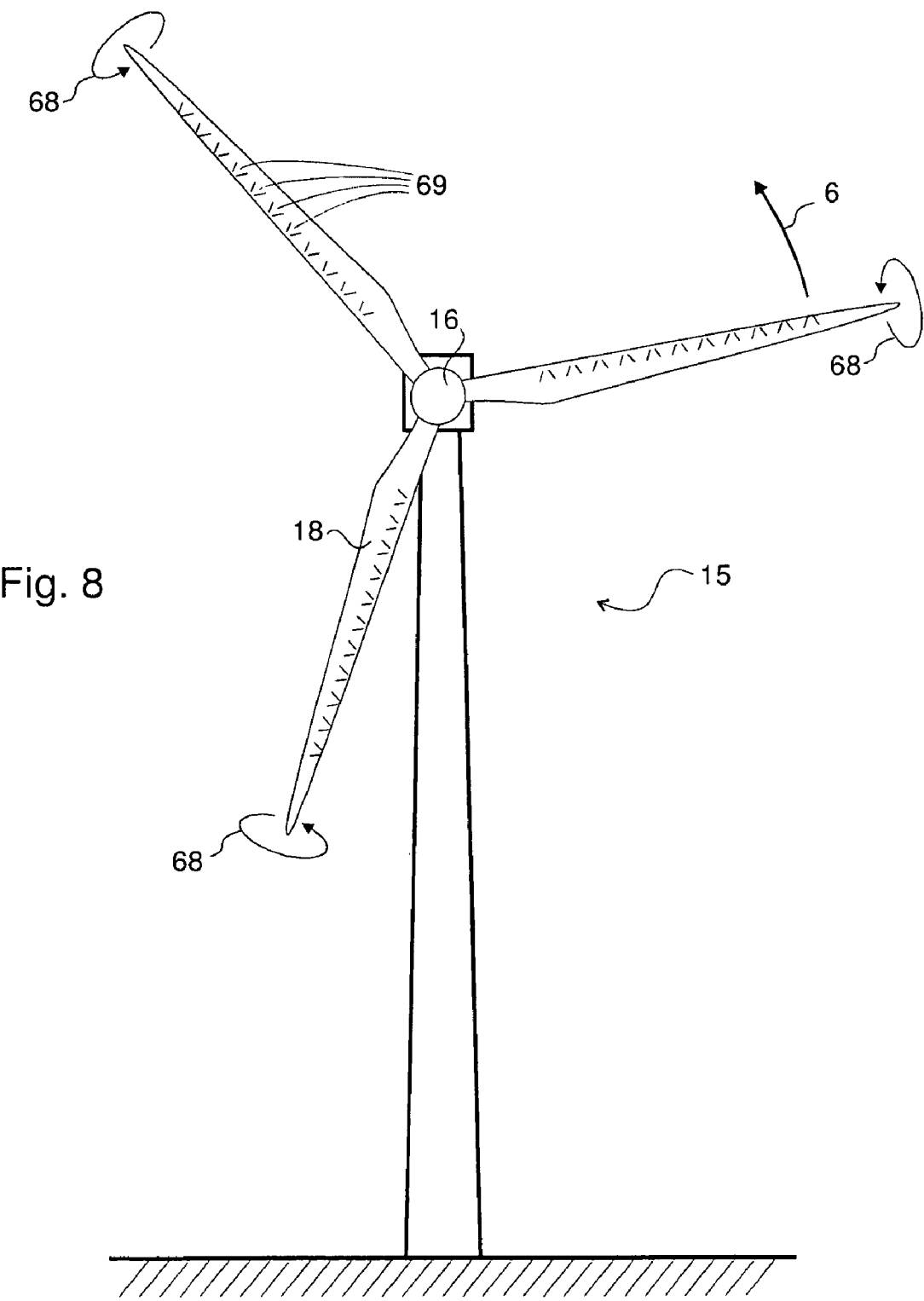
FIG. 8 shows horizontal axis turbine of FIG. 3 with blades up side down.
Figure 9:
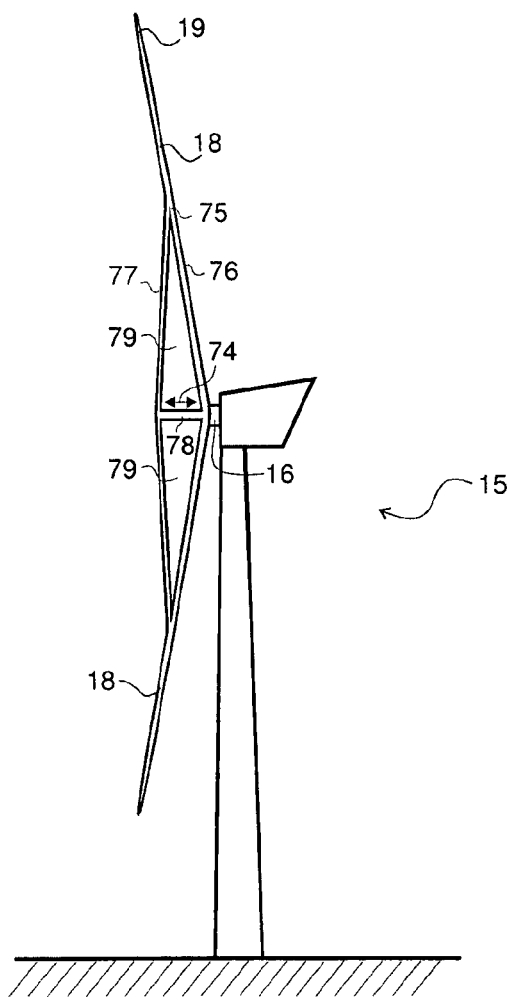
FIG. 9 shows a wind turbine with a 2-bladed rotor.
Figure 10:
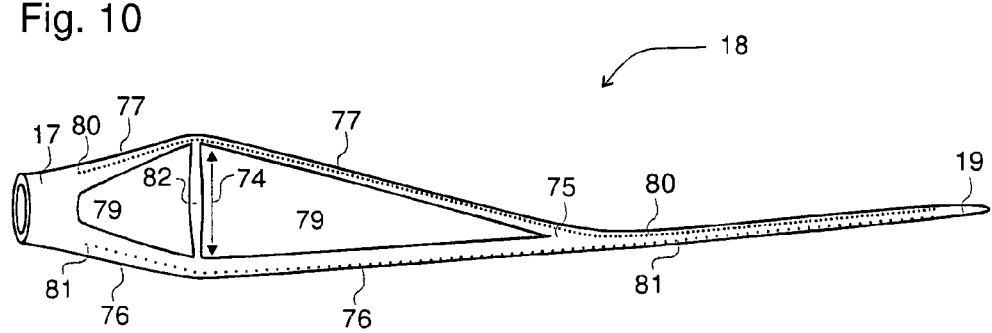
FIG. 10 shows a blade of a wind turbine.
Figure 11:
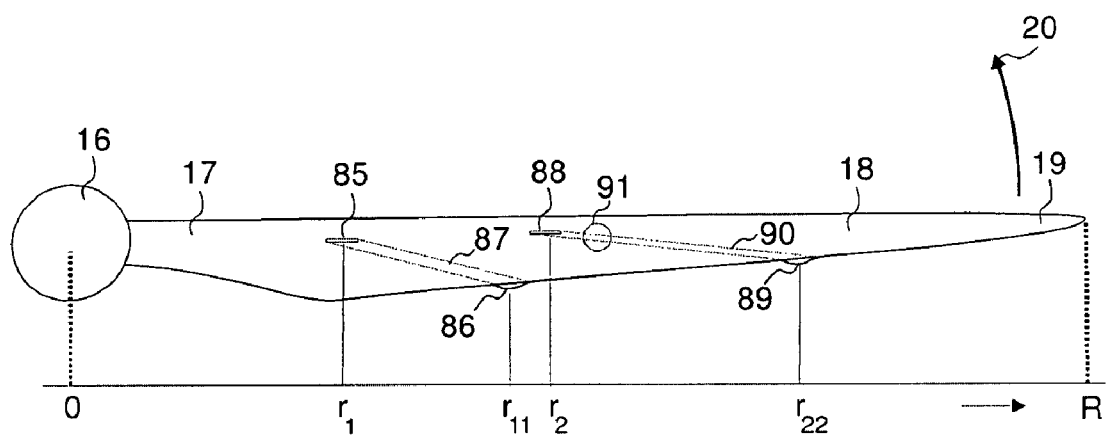
FIG. 11 shows a blade of a wind turbine.

FIG. 5 shows two oblique rows of VGs of which the front VG 61 of the upper line in the figure is located upstream relative to the most rear VG 62 of the lower line. Preferably VGs 61 and 62 generate vortices of the same direction of rotation. FIG. 6 shows the front base line with VGs 63 and the rear base line with VGs 64. FIG. 7 shows VGs 65 which extend over a relatively large part of the chord. FIG. 8 shows turbine 15 of FIG. 2 directly after the blades 18 with VGs 68 were turned around to the up side down position which is illustrated by arrows 68. In this up side down application of the blades the function of the aerodynamic pressure and suction sides are exchanged and the rotor rotates in opposite direction. The actual VGs are smaller and are applied in greater numbers then shown in the figure. FIG. 9 shows turbine 15 with a 2-bladed rotor of which the blades 18 split at division 75 in an upper blade 77 and a lower blade 76 which are connected at the extension of the main shaft 78. In both FIGS. 9 and 10 air can flow through the free spaces 79 between the upper blade and the lower blade, which upper blade and lower blade reach a distance 74 at the same radial position. The local chord is the sum of the chord of the upper blade and the chord of the lower blade at equal radial position. FIG. 10 shows a blade 18 with tip 19 and root 17. The substantially first type fibres 81 on the structural pressure side run from the blade root via the upper blade 76 and the division 75 towards the tip 19. The first type fibres 80 at the structural tensile side run from the root 17 via the lower blade 77 and the division 75 towards the blade tip 19. Spacer 82 is located between the upper and lower blade. Near 80 at the junction of blades 77 and 76, a tilting device can be provided for adjusting the pitch of the extemity of blade 18. FIG. 11 shows a blade 18 of a wind turbine with an inlet 85 at radial position $r_1$ which sucks in boundary layer air which suction is driven by the centrifugal force on the air in channel 87 which runs to the outlet 86 at radial position $r_{11}$. Inlet 88 is located relative to inlet 85 at the larger radial position $r_2$ and preferably has a stronger suction than inlet 85 and therefore this inlet has a separate channel 90 which preferably extends further in radial direction than channel 87. Channel 90 ducts the suck air to outlet 89 at radial position $r_{22}$.

Numerical values are given for parameters like wind speed (variation), drag and lift coefficient, nominal wind speed, angle of attack variation etc. The expert understands that those values are only indicative and actually are dependent on airfoil, design of the rotor and wind turbine and on the operational conditions. The expert will also understand that a turbine in this text refers to both vertical axis and horizontal axis turbines which are only type denotations which do not prescribe the orientation of the axis. He will also immediately understand that the invention is beneficial for all known types of wind turbines which operation is based on lift forces: constant and variable speed turbines, pitch to vane and pitch to stall controlled turbines, stall controlled turbines, and all known types of flying turbines such auto gyro type turbines and ladder turbines, said ladder turbines being a special kind of vertical axis turbine (U.S. Pat. No. 6,072,245) of which the entire blades should be regarded to operate at radial position R. The above text comprises physical explanations for the flow phenomena. It should be understood that the validity of those explanations is not related to the validity of the enclosed claims. It will be obvious for the expert that advantage is also obtained when the invention is combined with other wind turbine concepts such as e.g. cyclic pitching, controlling wind (US2006131889) and heat and flux (US2006232073).

The invention claimed is:

1. A wind turbine comprising a blade with an aerodynamic profile, said profile having in the range of 0.2R to 0.95R a 10 minutes averaged lift coefficient $c_l$ larger than 1.1, wherein within a range from 0.4R to 0.95R a vortex generator is disposed on said blade.

2. The wind turbine according to claim 1 wherein for tip speed ratios λ pertaining to the undisturbed wind speeds between 8 and 10 m/s, the chord number D $(=Nc_r r\lambda^2/R^2)$ for said blade between 0.5R and 0.8R and or the chord number D averaged over the range between 0.5R and 0.8R is less than 3.00, and particularly less than 2.75, and more particularly less than 2.50.

3. The wind turbine according to claim 1 comprising first type fibres which are located between 5% c and 70% c wherein within a cross section in the radial range between 0.3R and 0.7R said unidirectional fibres at the aerodynamic pressure side consist of at least 25% carbon fibres and particularly that said unidirectional fibres at the aerodynamic suction side comprise for at least 25% glass fibres.

4. The wind turbine according claim 1 wherein having a rotor the diameter of the rotor is larger than 60 m.

5. The wind turbine according to claim 1 wherein said blade comprises an airfoil with camber of more than 6% c.

6. The wind turbine according to claim 1 of a vertical axis type wherein the tip speed ratio λ is smaller than 3½ and particularly smaller than 3 and more particularly smaller than 2½.

7. The wind turbine according to claim 1 wherein said vortex generators comprise a surface of one of the plastics PVDF, FEP, PEEK, PI, PEI, PES and PFTE.

8. The wind turbine according to claim 1, wherein said vortex generators are arranged at an angle of less than 10° to the tangentials related to the centre of rotation.

9. The wind turbine according to claim 1 wherein the upstream side of more than 70% of said vortex generators has a shorter distance to the centre of rotation than the downstream side.

10. The wind turbine according to claim 1, wherein upstream of a base line with vortex generators, extra vortex generators are installed at a greater distance apart.

11. The wind turbine according to claim 1 wherein the effectiveness of the vortex generators is regulated by changing the position, or opening them out to a greater or lesser degree, or submerging them partly in the blade surface and in particular by activating the vortex generators by MEM tabs or piezoelectrics.

12. The wind turbine according to claim 1 comprising airfoil sections wherein the ratio $c_{l,max}/c_{l,min}$ is less than −1.2−0.2% cam.

13. The wind turbine according to claim 1 wherein said turbine has two active control options and in particular has one active control option and more in particular has no active control options, said control options are in the group pitch control and variable rotation speed control.

14. A wind turbine comprising a blade with an aerodynamic profile, said profile having in the range of 0.2R to 0.95R a 10 minutes averaged lift coefficient $c_l$ larger than 1.1, wherein in the case that the power coefficient $\frac{1}{3}<C_p<\frac{16}{27}$ that $M=-1.19+9.74C_p-21.01C_p^2+17.50C_p^3$ and that in said case in the radial range between 0.5R and 0.9R for a horizontal axis turbine and between 0.8R and R for a vertical axis turbine, the local chord is smaller than which follows from the equation C=M and or the average chord in said ranges is smaller than which follows from the equation C=M assuming that $c_l=1.1$.

15. A wind turbine comprising a blade with an aerodynamic profile, said profile having in the range of 0.2R to 0.95R and in particular of 0.5R to 0.95R a 10 minutes averaged lift coefficient $c_l$ larger than 1.1, wherein said blade in the direction from a tip towards a root at a radial position between 0.7R and 0.2R splits in an upper blade and a lower blade with in between a free space and that both the upper blade and the lower blade contribute to the aerodynamic lift and in particular that at a certain radial position the distance between the lower and the upper blade is larger than 5% R and more in particular is larger than 10% R.

16. The wind turbine according to claim 15 wherein within the range from 0.4R to 0.95R, a lift increasing means is integrated with said blade or is attached to it as a separate element.

17. The wind turbine according to claim 15 wherein for tip speed ratios λ pertaining to the undisturbed wind speeds between 8 and 10 m/s, the chord number D $(=Nc_r r\lambda^2/R^2)$ for said blade between 0.5R and 0.8R and or the chord number D averaged over the range between 0.5R and 0.8R is less than 3.00.

18. A wind turbine comprising a blade with an aerodynamic profile, said profile having in the range of 0.2R to 0.95R and in particular of 0.5R to 0.95R a 10 minutes averaged lift coefficient $c_l$ larger than 1.1, wherein said blade comprises profiles of at least 25% thickness which are used at radial positions larger than 0.55R.

19. The wind turbine according to claim 18 with at the suction side an inlet located at a radial position between 5% R and 70% R wherein said inlet is via a channel connected to an outlet located at a radial position which is relative to the inlet larger by at least a factor 0.9√2.

20. The wind turbine according to claim 18 wherein for tip speed ratios λ pertaining to the undisturbed wind speeds between 8 and 10 m/s, the chord number D $(=Nc_r r\lambda^2/R^2)$ for said blade between 0.5R and 0.8R and or the chord number D averaged over the range between 0.5R and 0.8R is less than 3.00.

21. The wind turbine according to claim 18 wherein in the case that the power coefficient $\frac{1}{3}<C_p<\frac{16}{27}$ that $M=-1.19+9.74C_p-21.01C_p^2+17.50C_p^3$ and that in said case in the radial range between 0.5R and 0.9R for a horizontal axis turbine and between 0.8R and R for a vertical axis turbine, the local chord is smaller than which follows from the equation C=M and or the average chord in said ranges is smaller than which follows from the equation C=M assuming that $c_l=1.1$.

22. The wind turbine according to claim 18 wherein within the range from 0.4R to 0.95R a vortex generator is integrated with said blade or is attached to it as a separate element.

23. The wind turbine according to claim 18 comprising first type fibres which are located between 5% c and 70% c wherein within a cross section in the radial range between 0.3R and 0.7R said unidirectional fibres at the aerodynamic pressure side consist of at least 25% carbon fibres and particularly that said unidirectional fibres at the aerodynamic suction side comprise for at least 25% glass fibres.

24. The wind turbine according to claim 18 wherein said blade comprises an airfoil with camber of more than 6% c.

25. A wind turbine comprising a blade with an aerodynamic profile, said profile having in the range of 0.2R to 0.95R a 10 minutes averaged lift coefficient $c_l$ larger than 1.1, wherein said blade comprises vortex generators located at the pressure side of a profile which preferably is thicker than 25% c, wherein said vortex generators are located at a chord position larger than 30% c.

26. A method of replacing a wind turbine blade, comprising removing a first blade of an existing turbine, and replacing a replacement blade in the turbine, wherein said replacement blade includes an aerodynamic profile, said profile having in the range of 0.2R to 0.95R and in particular of 0.5R to 0.95R a 10 minutes averaged lift coefficient $c_l$ larger than 1.1, particularly larger than 1.2 and more particularly larger than 1.4 and more particularly preferably about 1.6, and particularly that said replacement blade in the range of 0.7R to 0.95R comprises a local chord $c_r$ which is at least 10% and more particularly at least 20% smaller than the local chord $c_r$ of said first blade.

* * * * *

UNITED STATES PATENT AND TRADEMARK OFFICE
CERTIFICATE OF CORRECTION

PATENT NO. : 8,182,231 B2
APPLICATION NO. : 12/244186
DATED : May 22, 2012
INVENTOR(S) : Gustave Paul Corten It is certified that error appears in the above-identified patent and that said Letters Patent is hereby corrected as shown below:

Column 12, Line 46, Claim 21:

Delete:

"$M=-1.19+9.74C_p 21.01C_p^2+17.50C_p^3$"

And Insert:

--$M=-1.19+9.74C_p-21.01C_p^2+17.50C_p^3$--

Signed and Sealed this
Twenty-eighth Day of August, 2012

David J. Kappos
*Director of the United States Patent and Trademark Office*